US005275793A

United States Patent [19]

Johannes et al.

[11] Patent Number: 5,275,793

[45] Date of Patent: Jan. 4, 1994

[54] DIRECT COUPLED DEGASSER AND LIQUEFIER

[75] Inventors: Walter Johannes, Rochester; Daniel J. Wooster, Ontario, both of N.Y.

[73] Assignee: Eastman Kodak Company, Rochester, N.Y.

[21] Appl. No.: 937,074

[22] Filed: Aug. 28, 1992

[51] Int. Cl.[5] .......... B01D 17/00

[52] U.S. Cl. .......... 422/285; 422/286; 422/287; 422/288; 422/289; 422/290; 422/109; 422/112; 432/13; 432/161; 432/205; 430/640; 23/293 R; 423/659

[58] Field of Search .......... 422/285, 286, 287, 288, 422/289, 290, 108, 110, 109, 112; 241/30; 99/472; 432/161, 205, 13; 430/347, 640; 423/659; 23/293

[56] References Cited

U.S. PATENT DOCUMENTS

| | | | |
|---|---|---|---|
| 2,425,912 | 8/1947 | Appel et al. | 99/472 |
| 2,533,964 | 12/1950 | Scherer | 422/285 |
| 2,570,835 | 10/1951 | Mooney et al. | 222/389 |
| 2,686,109 | 8/1954 | Moule | 422/285 |
| 3,599,556 | 8/1971 | Madsen | 99/272 |
| 3,908,537 | 9/1975 | Bajcar et al. | 99/272 |
| 4,229,559 | 11/1981 | Shimizu et al. | 432/13 |
| 4,321,862 | 3/1982 | Stevenson, III | 99/472 |
| 4,369,069 | 1/1983 | Graesser et al. | 106/125 |
| 4,700,899 | 10/1987 | Powers et al. | 241/30 |
| 4,747,342 | 5/1988 | Schack et al. | 99/472 |

FOREIGN PATENT DOCUMENTS

3406600A1 2/1984 Fed. Rep. of Germany .

*Primary Examiner*—Robert J. Warden
*Assistant Examiner*—Hien Tran
*Attorney, Agent, or Firm*—Carl F. Ruoff

[57] ABSTRACT

The present invention describes a method and apparatus in which solid gelatin chunks are liquefied, tempered, and debubbled in a single operation. The debubbling step is accomplished by evacuating and sealing off the loaded solid reservoir and heat exchanger before initiating the liquefying step. After the vacuum is applied, the gelled chunks are pressed into the heat exchanger, where heat is applied to the gelled chunks of photographic material. This liquefies the gelled chunks of photographic material. When the liquefied product gives a positive pressure at the heat exchanger outlet, the liquefied product is allowed to flow from the heat exchanger. Liquefying and tempering are performed as the solid chunks are pushed through the heat exchanger by the reservoir piston.

3 Claims, 1 Drawing Sheet

DIRECT COUPLED DEGASSER AND LIQUEFIER

FIELD OF THE INVENTION

The present invention relates to a method and apparatus for providing temperature adjusted, bubble-free, liquefied gelatin to a coating station. More particularly, the present apparatus and method liquefies, tempers and degasses the gelatin in one operation.

BACKGROUND OF THE INVENTION

In the course of their production, photographic materials are typically chilled and stored in the gelled state following preparation in order to prevent qualitative degradation. It is then necessary to liquefy, temper and degas the gelled materials so that they can be coated onto a film or paper support. Tempering should be understood hereinafter to mean the adjusting of the liquefied photographic materials to a desired temperature. Gelled photographic materials include aqueous or solid based photosensitive or nonphotosensitive emulsions or dispersions.

In order to coat the gelled photographic materials onto a film or paper support, the materials must be liquefied, degassed and tempered. Many methods are known in the prior art for liquefying photographic materials. These schemes include batchwise and continuous methods. Conventional batch systems generally involve a kettle for liquefying the gelled material and then an ultrasonic debubbler for removing the gas within the liquefied material. In a continuous system for liquefying and degassing gelled material, the material is liquefied in a heat exchanger and then degassed in a centrifugal degasser.

However, none of the prior art methods liquefies the gelled photographic material while simultaneously degassing and tempering the gelled photographic material. The present invention liquefies, degasses and tempers the material in a single operation, and in such a manner that each increment of photographic material is subjected to the same thermal history.

SUMMARY OF THE INVENTION

The present invention describes a method and apparatus for degassing, tempering, and liquefying gelled chunks of photographic material. The gelled chunks of photographic material are loaded into a cylindrical reservoir which is connected to a heat exchanger. Evacuation by vacuum means is then initiated. The gelled chunks are forced into the heat exchanger, while the vacuum is continuously applied to the heat exchanger and reservoir and heat is applied to the heat exchanger. The pressure at the outlet end of the heat exchanger is monitored, and when it reaches a predetermined value, liquefied material is allowed to flow out of the heat exchanger and is piped or pumped to a coating station.

Figure 1:
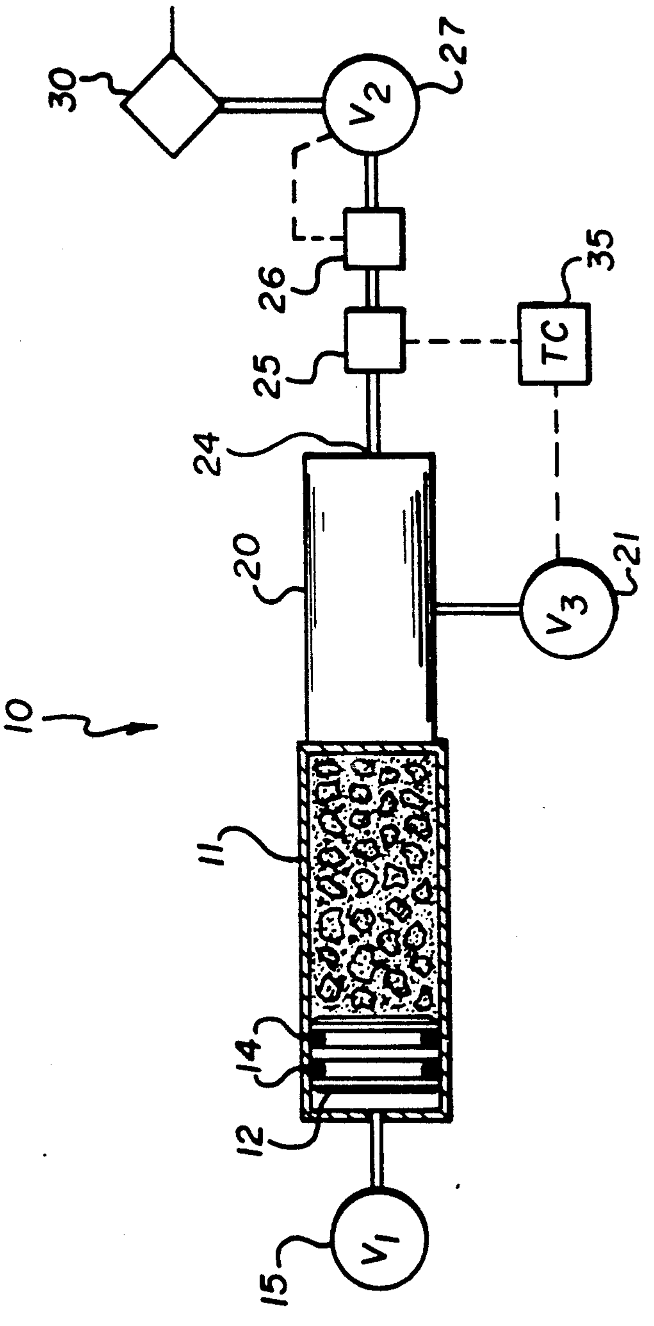
FIG. 1 shows a schematic drawing of the apparatus of the present invention.

For a better understanding of the present invention together with other objects, advantages and capabilities thereof, reference is made to the following description and appended claims in connection with the above-described drawing.

DESCRIPTION OF THE PREFERRED EMBODIMENT

FIG. 1 shows the apparatus of the present invention which is used to liquefy, degas and temper solid gelatin chunks in one unit operation. The apparatus includes a reservoir 11 into which the gelled chunks of photographic material are loaded. The reservoir 11 contains a piston 12 for pressing the gelled chunks into the heat exchanger 20. The piston 12, includes "O" rings 14 to prevent any backflow from the reservoir 11. The piston pressure is controlled by high pressure air or hydraulic fluid through valve 15.

The heat exchanger 20 is heated by hot water which is introduced through valve 21. Temperature sensor 25 and pressure sensor 26 are positioned at the downstream end of heat exchanger 20. The temperature sensor 25 is connected to a control means 35 which regulates the hot water supply valve 21. Also located at the downstream end of the heat exchanger 20 is valve means 27. Valve means 27 is connected to control means (not shown) which switches when a positive pressure is sensed by pressure sensor 26 near the outlet 24 of heat exchanger 20. The reservoir 11 is separable at the heat exchanger 20 for loading the solid chunks of gelled photographic material.

The operation is started by loading the reservoir 11 with gelled chunks and connecting reservoir 11 to heat exchanger 20. The evacuation step is started by turning valve 27 to direct a vacuum to the heat exchanger 20 and reservoir 11. The purpose of the vacuum at this stage is to draw out of the entire system all the air not contained within the chunks. After the vacuum is established, valve 15 is opened and pressure is applied to piston 12 thereby pushing the solid chunk gelatin into the heat exchanger 20. As the solid chunk gelatin is pushed into the heat exchanger 20, valve 21 is opened and the heat exchanger 20 is controlled to a setpoint through a temperature sensor 25, valve 21 and a control means 35.

When a predetermined positive pressure (i.e. greater than 5 psi) is detected by pressure sensor 26, flow of the liquefied photographic material to the coating station is initiated by switching valve 27 to its flow control position, simultaneously stopping the application of vacuum to the system. The flow control is accomplished by either a positive displacement pump, pressure control valve, and/or a flowmeter. The positive displacement pump, is shown generally by diamond 30 in FIG. 1. The capacity of the system determines the size of the reservoir 11 while the heat exchanger area determines the flow rate limitations.

Using a single reservoir or batch system, only the material in the reservoir can be liquefied. Thus, the capacity is the volume of the reservoir. A continuous system is possible by switching the heat exchanger between two or more reservoirs, using a switching valve. One reservoir would be filled with gelled chunks of photographic material while the other one is emptied.

The heat exchanger rate is determined by the area of the heat exchanger and the maximum wall temperature to which the photographic material can be exposed. With photographic emulsions the maximum wall temperature is approximately 140° F. With the wall temperature maximum fixed, the only other way to increase rate is to increase the area of the heat exchanger.

EXAMPLES 1-6

Shown below in Table I are the summarized experimental data using the apparatus of the present invention. The reservoir 11 and the heat exchanger 20 were made from a 4-inch inner diameter tube. The operating procedure for the examples shown below was to load the system with solid gelled photographic material of the size indicated in Table I. The system was evacuated for at least 3 minutes before the piston pressure was initiated. The vacuum level drawn from the heat exchanger was 28 inches of mercury. The system (reservoir and heat exchanger) was continually evacuated until all the material within the heat exchanger was liquefied, as determined by a pressure of greater than 5 psi at the outlet of the heat exchanger.

TABLE I

| Example No. | Piston Pressure (psi) | Solid Size | Liquid Flow Rate | Heat Exchanger Spray Rate of 120° F. $H_2O$ |
|---|---|---|---|---|
| 1 | 30 | 1/4" × 1/4" | 91 gm/min | 500 |
| 2 | 30 | 3/8" × 3/8" | 53 gm/min | 500 |
| 3 | 50 | 1/4" × 1/4" | 462 gm/min | 800 |
| 4 | 50 | 3/8" × 3/8" | 250 gm/min | 800 |
| 5 | 80 | 1/4" × 1/4" | | 800 |
| 6 | 80 | 3/8" × 3/8" | 800 gm/min | 800 |

As shown in Table I, a wide range of flow rates of degassed liquefied photographic material is possible from the apparatus of the present invention. In every example the liquefied photographic material was free from entrained air. Thus the present invention provides a one step apparatus and method for providing degassed, tempered, liquid photographic material from solid gelled chunks of photographic material.

While there has been shown and described what are at present considered to be the preferred embodiments of the invention, it will be obvious to those skilled in the art that various alterations and modifications may be made therein without departing from the scope of the invention.

What is claimed:

1. A method for degassing and melting gelled chunks of photographic material comprising:

filling a reservoir with gelled chunks of photographic material and connecting the reservoir to a heat exchanger;

applying a vacuum to the reservoir and the heat exchanger;

applying heat to the heat exchanger;

pressing the gelled chunks of photographic materials into the heat exchanger;

measuring a pressure within the heat exchanger;

diverting flow out of the heat exchanger when the pressure within the heat exchanger has reached a predetermined value.

2. The method according to claim 1 wherein the reservoir comprises a cylinder including a piston for pressing the gelled chunks of photographic material.

3. The method according to claim 1 wherein flow out of the heat exchanger is accomplished by a positive displacement pump.

* * * * *